United States Patent
Orsi

[19]

[11] Patent Number: 6,021,602
[45] Date of Patent: Feb. 8, 2000

[54] MODULAR STRUCTURE FOR AEROPONIC CULTIVATIONS

[75] Inventor: Marco Orsi, Turin, Italy

[73] Assignee: Consulagri S.R.L., Turin, Italy

[21] Appl. No.: 09/230,965

[22] PCT Filed: Jun. 9, 1998

[86] PCT No.: PCT/EP98/03441

§ 371 Date: Feb. 3, 1999

§ 102(e) Date: Feb. 3, 1999

[87] PCT Pub. No.: WO98/56237

PCT Pub. Date: Dec. 17, 1998

[30] Foreign Application Priority Data

Jun. 11, 1997 [IT] Italy .................................. TO97A0512

[51] Int. Cl.[7] .................................................. A01G 31/00
[52] U.S. Cl. .............................. 47/62 A; 47/62 N; 47/82; 47/83
[58] Field of Search ................................. 47/62 R, 62 A, 47/62 N, 59, 60, 82, 83, 62 C, 62 E

[56] References Cited

U.S. PATENT DOCUMENTS

| | | | |
|---|---|---|---|
| 4,035,950 | 7/1977 | Anselm | 47/59 |
| 4,059,922 | 11/1977 | Digiacinto . | |
| 4,075,785 | 2/1978 | Jones | 47/64 |
| 4,218,847 | 8/1980 | Leroux | 47/59 |
| 4,255,898 | 3/1981 | Greenbaum | 47/85 |
| 4,313,278 | 2/1982 | Pointing et al. | 47/1.1 |
| 4,704,818 | 11/1987 | Cameron | 47/62 C |
| 4,869,019 | 9/1989 | Ehrlich . | |
| 4,965,962 | 10/1990 | Akagi . | |

FOREIGN PATENT DOCUMENTS

| | | | |
|---|---|---|---|
| 0288670 | 11/1988 | European Pat. Off. . | |
| 0518210 | 12/1992 | European Pat. Off. . | |
| B-1129081 | 6/1986 | Italy . | |
| 1531929 | 12/1989 | U.S.S.R. | 47/62 A |
| 2015313 | 9/1979 | United Kingdom . | |
| 2056833 | 3/1981 | United Kingdom | 47/62 C |

OTHER PUBLICATIONS

Patent Abstracts of Japan vol. 015, No. 259 (C–0846), Jul. 2, 1991 & JP 03 087125 A (Hitachi Ltd), Apr. 11, 1991—see abstract.

Patent Abstracts of Japan vol. 013, No. 158 (C–586), Apr. 17, 1989 & JP 63 317029 A (Nobuko Otani), Dec. 26, 1988—see abstract.

Primary Examiner—Michael J. Carone
Assistant Examiner—James S. Bergin
Attorney, Agent, or Firm—Guido Modiano; Albert Josif

[57] ABSTRACT

A modular structure for aeroponic cultivations comprising a plurality of prefabricated side panels which are meant to receive plants being cultivated and a plurality of prefabricated flat bases to which the side panels are joined by means of respective interlock couplings in order to form a structure which is substantially shaped like an inverted V and in which the side panels are mutually connected along an upper ridge line by respective ridgecaps; a pumping unit and a spraying apparatus are also provided in order to feed an atomized nutrient solution inside the structure.

15 Claims, 8 Drawing Sheets

MODULAR STRUCTURE FOR AEROPONIC CULTIVATIONS

BACKGROUND OF THE INVENTION

The present invention relates to a modular structure for aeroponic cultivations.

Conventional soilless cultivation methods consist in feeding active principles directly to the root of the plants by means of an adapted vehicle, usually water.

In particular, Italian patent no. 1,129,081 disclosed a soilless cultivation method, termed aeroponic cultivation, which consists in feeding the crops with an aerosol in which fertilizers and active principles in general are dissolved. Said aerosol is atomized mechanically in a closed and dark environment in which the roots of the cultivated plants are immersed. The roots are supported, with removable supports interposed, by the walls that delimit the environment, and the plants are arranged so that the foliage lies outside said environment.

This method is performed by means of hollow modular chambers which are usually arranged inside conventional greenhouses even with a makeshift detachable structure.

Conventional chambers have a bowl-like base with a rectangular plan and a cover which has a trapezoidal cross-section, protrudes upwards and has, at least at the larger front walls, a plurality of aligned holes which are adapted to receive corresponding detachable supports, hereinafter termed culture plugs. The plugs have a star-shaped hole which has a lobate profile and are meant to receive the plants, which are arranged so that their roots are inside the chamber and the foliage is outside it. The density of the crops on each wall of the chamber can be changed, according to the type of plant being cultivated, by replacing the culture plugs with blind plugs.

The chambers can be used individually or in batteries; for this purpose, the base of each chamber is provided with couplings for hydraulic connection to the adjacent chambers.

This conventional cultivation method is highly satisfactory in terms of yield of harvested product, in relation to the active principles used and also because it is possible to keep the temperature inside the chamber higher than the external temperature, in order to contain the heating level of the greenhouse environment and to maintain physiological plant activity even in case of low temperatures. It also facilitates tending, simplifies harvesting, which is performed by personnel standing up, and significantly reduces, for an equal crop density, the occupied soil and therefore the surface of the greenhouses.

However, the chambers currently used to perform the above aeroponic cultivation method have many drawbacks which significantly limit the diffusion of the method. The conventional chambers are in fact produced by molding polymeric material and therefore on the one hand their dimensions can be limited for cultivation purposes but are in any case forced by the need to contain the dimensions of molding presses within reasonable limits. On the other hand, they are still rather bulky for transport, storage and handling purposes, since they are typically 180 to 200 cm high and have an equally long main base side. Their modularity is also rather rigid, in that the expansion of a battery of the chambers entails a minimum increase in the length of the greenhouse by approximately 300–350 cm for each added chamber.

The conventional chambers also have high manufacturing costs which negatively affect initial installation costs.

SUMMARY OF THE INVENTION

The aim of the present invention is to eliminate these drawbacks, and within the scope of this general aim the invention has the following objects:

to provide a continuous modular structure which can be expanded in a stepless manner in any way and is therefore adapted to improve and better organize the distribution, inside said structure, of the atomized solution that feeds the crops;

to provide a modular structure which can be manufactured with simplified industrial processes which are economically advantageous and accordingly has low installation costs;

to provide a modular structure in which the components of the structure individually have a small bulk and in particular are substantially flat and can therefore be transported, stored and handled easily;

to provide a modular structure which has high static stability and at the same time is lightweight;

to provide a structure which can be assembled and disassembled easily even by unskilled personnel;

to provide a structure which facilitates planting of the plants and allows a higher crop density per unit surface.

According to the present invention, this aim, these important objects and others which will become apparent from the following detailed description are achieved with a modular structure for aeroponic cultivations which has the specific characteristics stated in the claims that follow.

Substantially, the structure according to the invention is based on the concept of providing a closed aeroponic cultivation environment by assembling a plurality of prefabricated side panels and of prefabricated flat bases to which said panels are joined by means of respective interlock couplings to form a structure which is substantially shaped like an inverted V.

For this purpose, the panels that delimit the side walls of the structures meant to receive the cultivated plants are mutually connected in their upper part by ridgecaps which also retain the pipes for feeding the aqueous nutrient solution and are provided with eyelets for the engagement of anchoring hooks. The adjacent panels are connected end to end to each other without discontinuities by interlock couplings provided with complementary recesses which cooperate with quick-coupling screws. The resulting structure is closed, at its ends, by removable plug panels. Each side panel has a composite structure which is characterized by a grid-like support made of thermoformable plastics with hexagonal through openings which is interposed, in a sandwich-like fashion, between two calendered PVC surface sheets. One sheet is meant to remain inside the closed cultivation environment and the other sheet is meant to remain on the outside of the panel. Both sheets act as elements for closing and blocking the openings of the grid-like support.

The structure of the panels is advantageously obtained by hot calendering with a continuous process. In practical use, the openings of the panels are exposed by partially removing both surface sheets, which are cut along the perimeter of the openings, which can thus receive the culture plugs provided with the plant passage hole.

The prefabricated bases of the structure have a substantially channel-shaped profile with a cross-section which is shaped like an inverted triangle and are constituted by modular segments mutually connected end to end and rigidly coupled by means of snap-acting retention levers.

BRIEF DESCRIPTION OF THE DRAWINGS

The characteristics, purposes and advantages of the modular structure according to the invention will become apparent from the following detailed description and accompanying drawings, given by way of non-limitative example, wherein.

DESCRIPTION OF THE PREFERRED EMBODIMENTS

Figure 1:
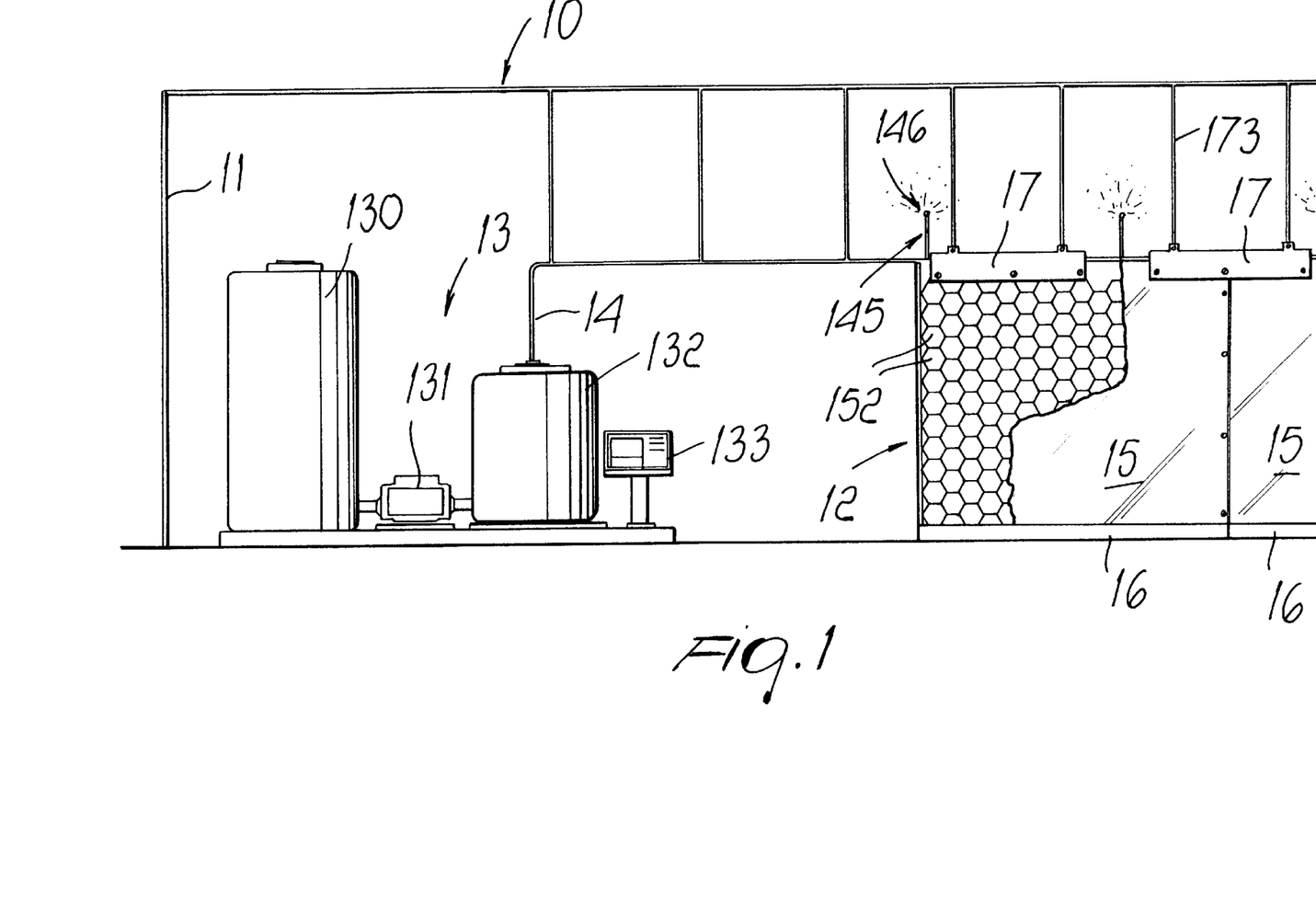
FIG. 1 is a partially broken away partial elevation view of a greenhouse aeroponic cultivation apparatus provided with the modular structure according to the invention.
Figure 2:
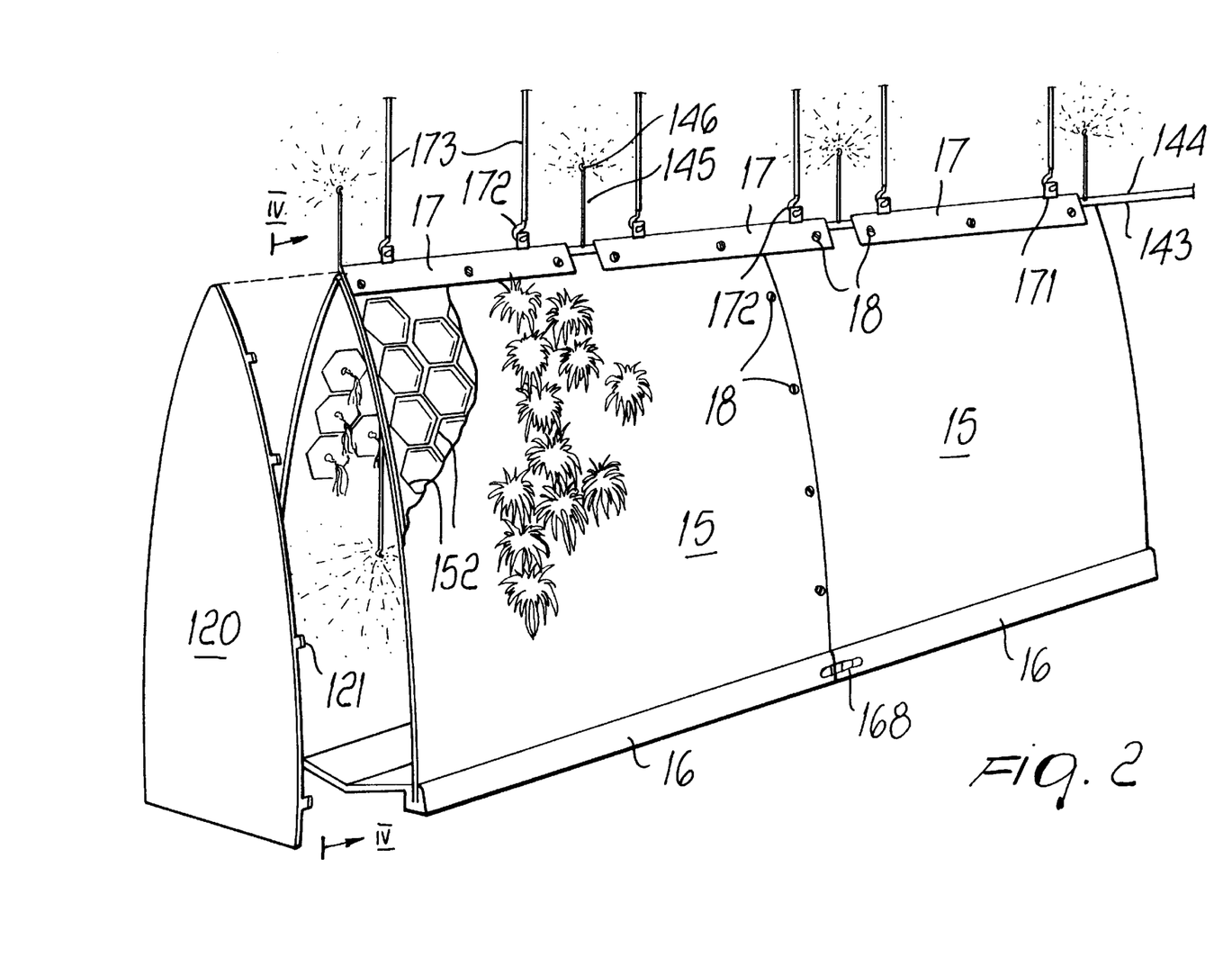
FIG. 2 is a partially broken away detailed perspective view of the modular structure of FIG. 1.

In FIG. 1, the reference numeral 10 generally designates a conventional greenhouse with a metal structure 11 composed of permanent or detachable elements and with infilling formed by sheets of glass or plastic material. The greenhouse 10 contains the modular structure 12 according to the invention, which internally encloses a closed aeroponic cultivation environment. In the environment an atomized solution of water, in which the culture nutrient components are dissolved, is fed by means of an electronically-controlled feeding and pumping unit 13 and by means of a distribution and spraying apparatus 14 described in greater detail hereinafter.

The structure 12 is obtained, according to the invention, by assembling a plurality of prefabricated side panels 15 and of prefabricated flat bases 16, to which the panels 15 are joined by means of respective interlock connections to form a structure which is substantially shaped like an inverted V. For this purpose, the flat bases 16, constituted by modular segments made of thermoplastic material, have a channel-shaped profile (FIG. 3), with a bottom 160 which is shaped substantially like an inverted triangle and ends with lateral ribs 161 provided with U-shaped seats 162 meant to receive and accommodate, with an interlock action, the lower edge of the panels 15. Each flat base segment 16 also has, in order to provide watertightness, an elastomeric gasket 163 which is arranged on one end 164 of the segment and is adapted to cooperate with the gasketless end 165 of the adjacent flat base segment, and two elastomeric gaskets 166 which are arranged on the inner edge of the U-shaped seats 162 and are adapted to cooperate with the internal surface of the panels 15.

Figure 3:
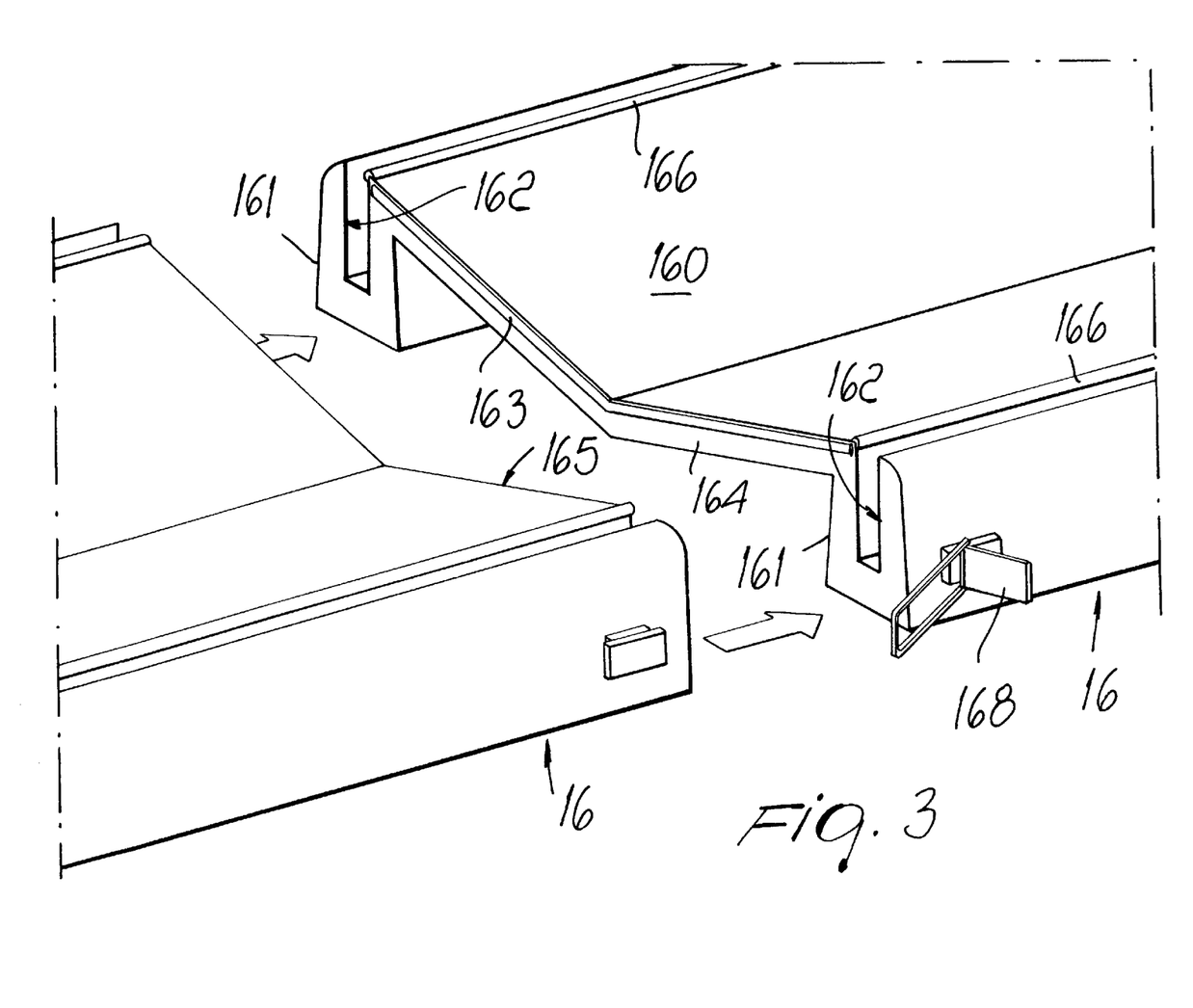
FIG. 3 is a detailed perspective view of the connection of two modular segments of flat bases of the structure according to the invention.

The individual flat base segments 16 are connected to the adjacent segments, so as to form continuous bases of the chosen length, by means of conventional snap-acting retention levers 168, which are clearly shown in detail in FIG. 3. At their upper part, the panels 15 are mutually connected by ridgecaps 17 which in addition to acting as connecting elements also retain the pipes of the apparatus 14 for distributing and spraying the atomized solution.

Figures 4, 5:
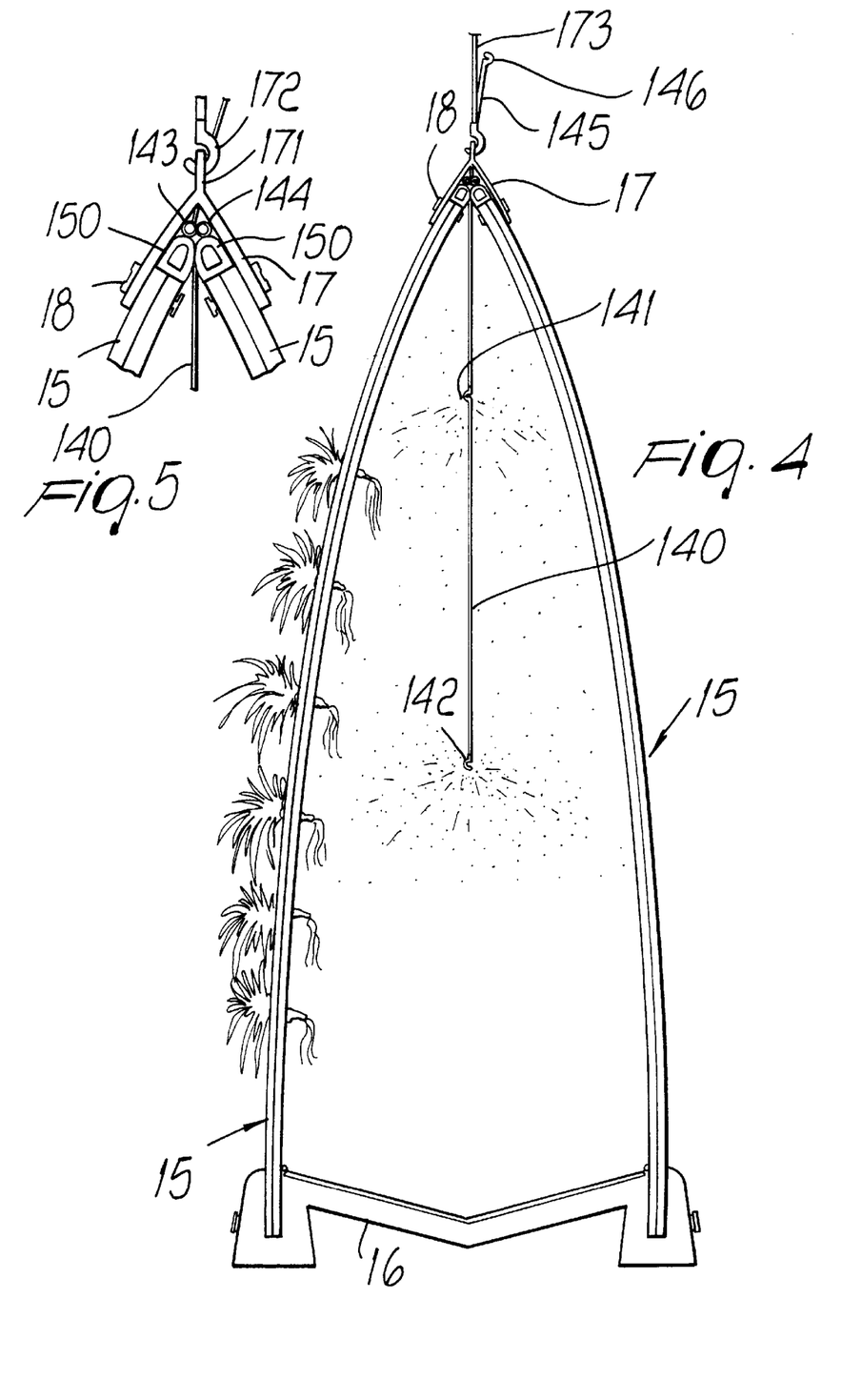
FIG. 4 is a view taken in the direction of the arrows IV—IV of FIG. 2.
FIG. 5 is an enlarged-scale view of a detail of FIG. 4.

As clearly shown in the detail view of FIG. 5, the upper edge of the panels 15 is provided with respective elastomeric gaskets 150 of the annular type which are meant to ensure watertightness at the ridge of the structure 12 and at the same time allow, by elastic deformation, the descent of branches 140 of the distribution apparatus 14 which support one or more spray nozzles 141–142.

Preferably, according to the invention, the ridgecaps 17 are made of metallic material, for example high-strength aluminum alloy, and have eyelets 171 in which hooks 172 engage in order to anchor the structure 12; said hooks are supported at the ends of corresponding retention braces 173, the other end of which is connected to the structure 11 of the greenhouse 10. The ridgecaps 17 are rigidly coupled to the respective edge of the panels by means of quick-coupling screws 18 described in greater detail hereinafter.

Figure 6:
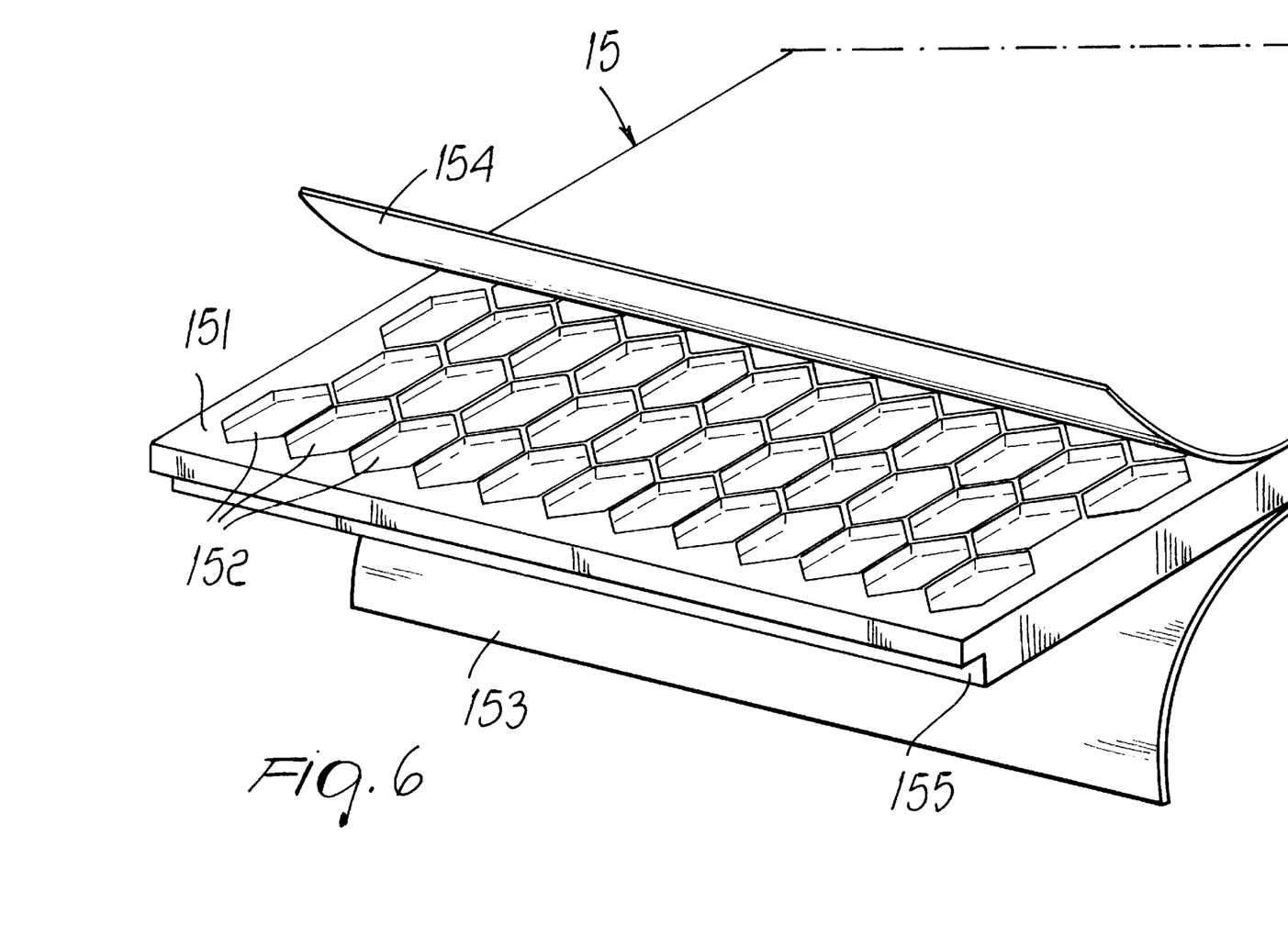
FIG. 6 is a detailed partially exploded perspective view of composition of the panels of the structure.

With reference now to the detail view of FIG. 6, it can be seen that each panel 15 has a composite structure which comprises a grid-like support 151, typically made of thermoformable plastic material, with hexagonal through openings 152. The thickness of the support is preferably between 5 and 15 mm. The support 151 is interposed in a sandwich-like fashion between two calendered surface sheets 153–154 made of polyvinyl chloride, commonly termed PVC; one sheet is meant to remain inside the closed cultivation environment, while the other sheet is meant to remain on the outside of the panel. Both sheets are meant to close and block the openings 152 of the grid-like support. Both surface sheets 153–154 are opaque to the light and the internal sheet 153 is preferably dark in order to ensure that there is no light in the cultivation environment inside the structure 12.

Figure 7:
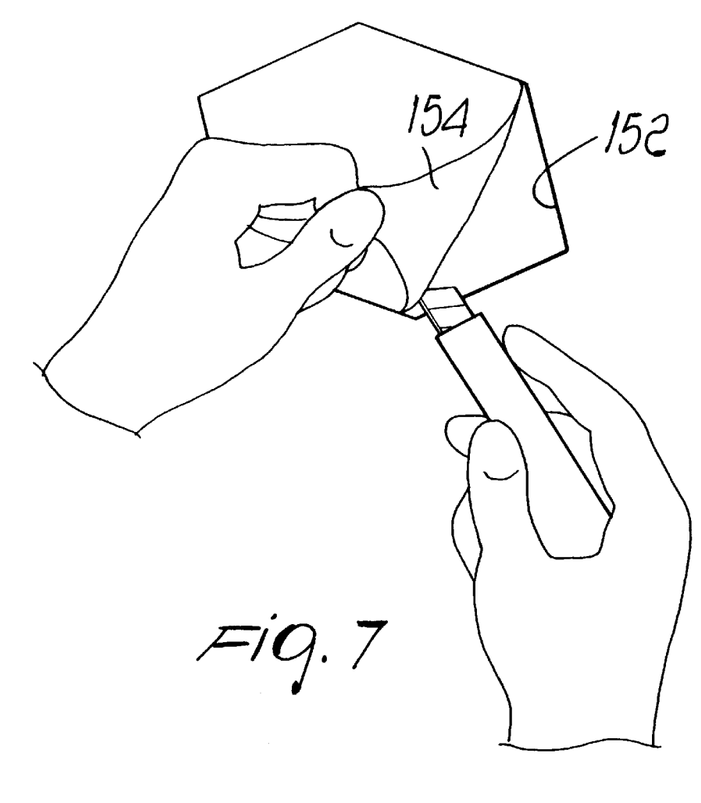
FIG. 7 is an ideogram which shows the method for using the openings of the panels.

The composite structure of the panels 15 described above is advantageously obtained by hot calendering with a continuous process, for example by means of calendering rolls which are adapted to form the through openings 152 on the support 151. In practical use, the openings of the installed panels 15 are exposed according to the requirements by partially removing both surface sheets 153–154, which are cut along the perimeter of said openings, as clearly shown in the ideogram of FIG. 7.

Figure 8:
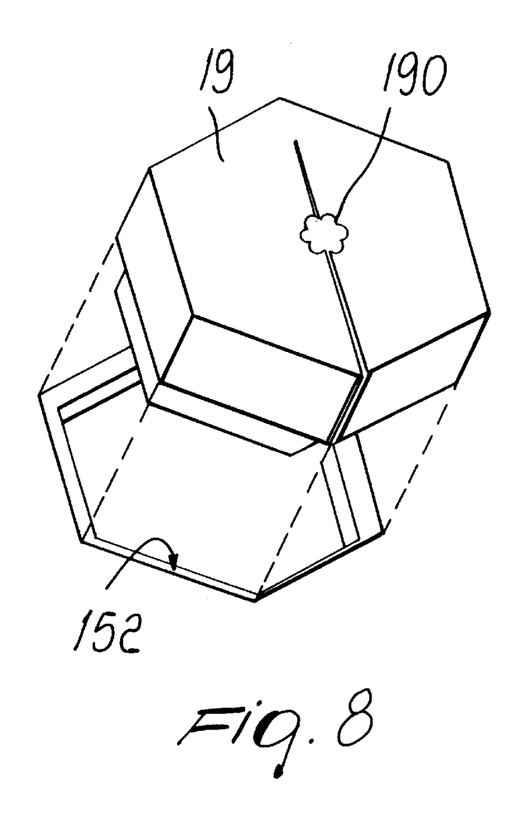
FIG. 8 is a perspective view of a culture plug which cooperates with the openings of the panels.

Corresponding culture plugs 19 are inserted in the exposed openings 152; each plug has a lobate star-shaped hole 190 which allows the stem of the plants being cultivated to pass and grow. As shown in the figure, the plants are arranged so that their roots lie inside the cultivation environment and so that the foliage is outside it, in the greenhouse environment. If necessary, the culture plugs can be replaced with blind plugs which block and close the respective openings 152 which are no longer in use.

Figure 9:
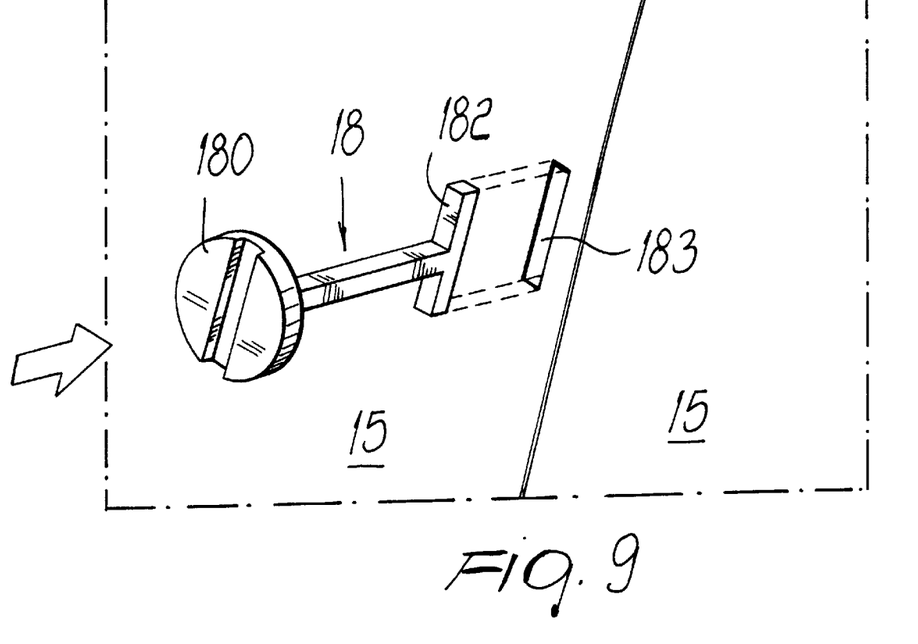
FIGS. 9 and 9A are views of details of FIG. 2, illustrating in detail the screws for connecting the panels.
Figure 9A:
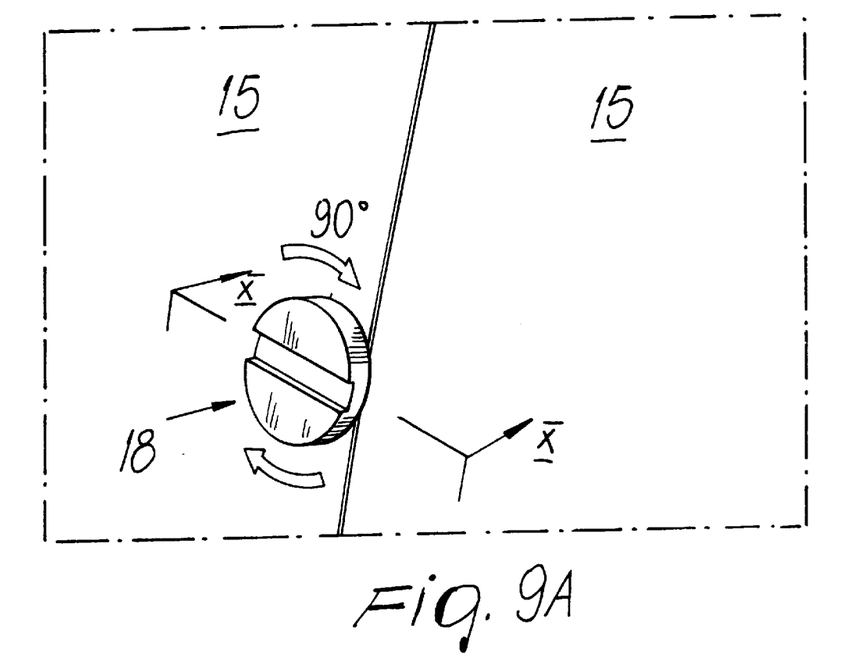
Figure 10:
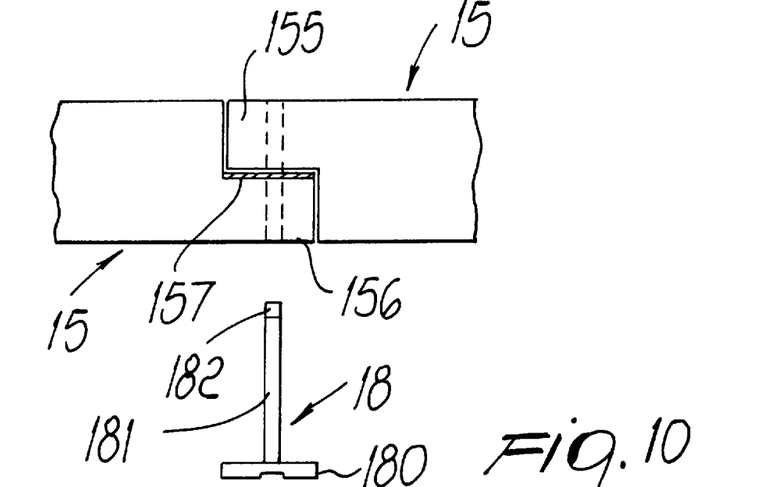
FIGS. 10–10A–10B are similar enlarged-scale sectional views, taken along the plane X—X of FIG. 9A, illustrating the sequence for closing the quick-coupling screws.
Figure 10A:
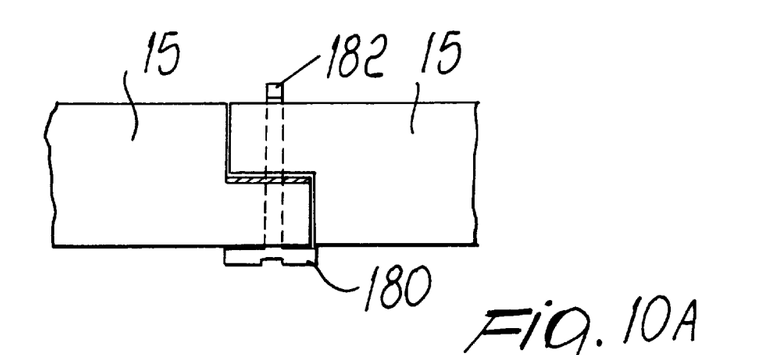
Figure 10B:
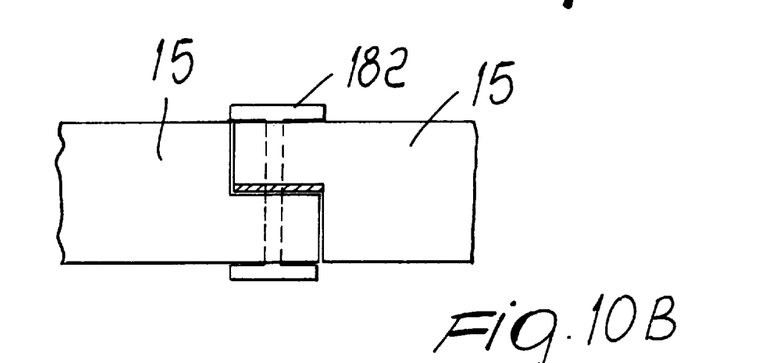

The panels 15 are arranged side by side and are mutually coupled in order to form a continuous structure 12 whose extension can be changed at will; its ends are closed with blind plug panels 120 which are provided with undercut retaining hooks 121. To provide mutual coupling, the panels 15 have, on their contiguous edges, respective complementary coupling recesses 155–156 (FIGS. 6–10) which are provided with elastomeric gaskets 157 and which, by mutually overlapping, ensure the continuity of the lateral surfaces of the structure and the tightness of the joints of the panels. The panels are furthermore mutually coupled by means of the quick-coupling screws 18, the structure of which is shown in the detail view of FIG. 9. The screws comprise a head 180 and a prism-shaped shank 181 which ends with an end cross-member 182 adapted to cooperate with a corresponding slot 183 which is formed in the panels 15 and through which said cross-member 182 passes. The screws are inserted in the respective slots 183 and then turned through 90° so that their end cross-member 182 lies at right angles to the axis of the respective slot.

The system 14 for distributing and spraying the atomized solution preferably has two outlets, is advantageously of the type disclosed in WO 97/47182 in the name of the same Applicant, and comprises a first pipe 143, from which the branches 140 extend, enter the structure 12 and support the spray nozzles 141–142, and a second pipe 144 from which corresponding branches 145 extend upwards and support respective spray nozzles 146 which atomize the solution in the environment of the greenhouse 10, wetting the leaves of the crops in order to improve absorption of the active principles.

The feeding and pumping unit 13 can assume different configurations according to the operating requirements. Typically, it is composed, as shown in FIG. 1, of a reservoir 130 of fertilizer mix which is forced, by means of a delivery pump 131, into a surge tank 132 to which the distribution and spraying apparatus system 14 is connected; the unit is adjusted and programmed by an electronic controller 133 which is provided with a programming keyboard and with a display monitor.

Without altering the concept of the invention, the details of execution and the embodiments may of course vary extensively with respect to what has been described and illustrated by way of non-limitative example without thereby abandoning the scope of the invention.

What is claimed is:

1. A modular structure for aeroponic cultivations, comprising a plurality of prefabricated side panels which are meant to receive plants being cultivated and a plurality of prefabricated flat bases to which said side panels are joined by means of respective interlock couplings in order to form a structure which is substantially shaped like an inverted V and in which said side panels are connected along an upper ridge line by respective ridgecaps; means being provided in order to feed an atomized nutrient solution inside said structure.

2. A modular structure according to claim 1, wherein the flat bases are constituted by modular segments of thermoplastic material which have a channel-shaped profile, with a bottom which is substantially shaped like an inverted triangle and with two U-shaped lateral ribs which are meant to receive and accommodate, with an interlock action, the lower edge of the side panels.

3. A modular structure according to claim 2, wherein each flat base segment has, in order to provide watertightness, an elastomeric gasket, which is arranged on one end of the segment and is adapted to cooperate with the gasketless end of the adjacent flat base segment, and two elastomeric gaskets which are arranged on the inner edge of said U-shaped lateral ribs and are adapted to cooperate with the respective internal surfaces of said side panels.

4. A modular structure according to claim 2, wherein the individual flat base segments are connected to the adjacent segments by means of snap-acting retention levers.

5. A modular structure according to claim 1, wherein the upper edge of said side panels is provided with respective elastomeric gaskets of the annular type, which ensure watertightness at the ridge of the structure and allow, by elastic deformation, the descent of branches of an apparatus for distributing the atomized solution which support one or more spray nozzles.

6. A modular structure according to claim 5, wherein said ridgecaps, in addition to acting as elements for connecting the side panels, retain pipes of said distribution apparatus.

7. A modular structure according to claim 1, wherein said ridgecaps are made of metallic material, are rigidly coupled to the side panels by means of quick-coupling screws, and are provided with eyelets in which end hooks of retaining braces engage in order to anchor the structure.

8. A modular structure according to claim 1, wherein each side panel has a composite structure which comprises a grid-like support made of thermoformable plastic material with hexagonal through openings, interposed in a sandwich-like fashion between two calendered PVC surface sheets, one of said sheets being meant to remain inside the closed cultivation environment, the other one of said sheets being meant to remain on the outside of the panel; both sheets being meant to close and block the openings of the grid-like support; said openings being exposed for use, in order to receive respective culture plugs, by partially removing both of said calendered surface sheets by means of cuts made along the perimeter of said openings.

9. A modular structure according to claim 8, wherein both of said calendered surface sheets are opaque to light.

10. A modular structure according to claim 8, wherein said composite structure of the side panels is achieved by hot calendering with a continuous process by means of calendering rolls which are adapted to form said hexagonal through openings.

11. A modular structure according to claim 1, wherein said side panels have, on their adjacent edges, respective complementary connecting recesses which by mutually overlapping, with an elastomeric gasket interposed, ensure the continuity of the lateral surfaces of the structure and the tightness of the joints of the panels.

12. A modular structure according to claim 11, wherein the joints of the panels are completed by quick-coupling screws.

13. A modular structure according to claim 12, wherein said quick-coupling screws comprise a head and a prism-shaped shank which ends with an end cross-member which passes through corresponding slots of the panels; said screws being closed by turning through 90° in order to move said cross-member so that it lies at right angles to the slot.

14. A modular structure according to claim 1, wherein said means for feeding the atomized nutrient solution comprise a distribution and spraying apparatus having two outlets, which comprises a first pipe, with corresponding branches which descend into the structure and are provided with respective spray nozzles, and a second pipe with corresponding branches which are directed upwards and support respective spray nozzles which atomize the solution outside said structure.

15. A modular structure according to claim 14, wherein said means for feeding the atomized nutrient solution further comprise a reservoir of fertilizer mix, a delivery pump and a surge tank, to which said spraying apparatus is connected.

\* \* \* \* \*